J. R. THOMAS.
Eye for Hoes and other Tools.
No. 228,419.    Patented June 1, 1880.
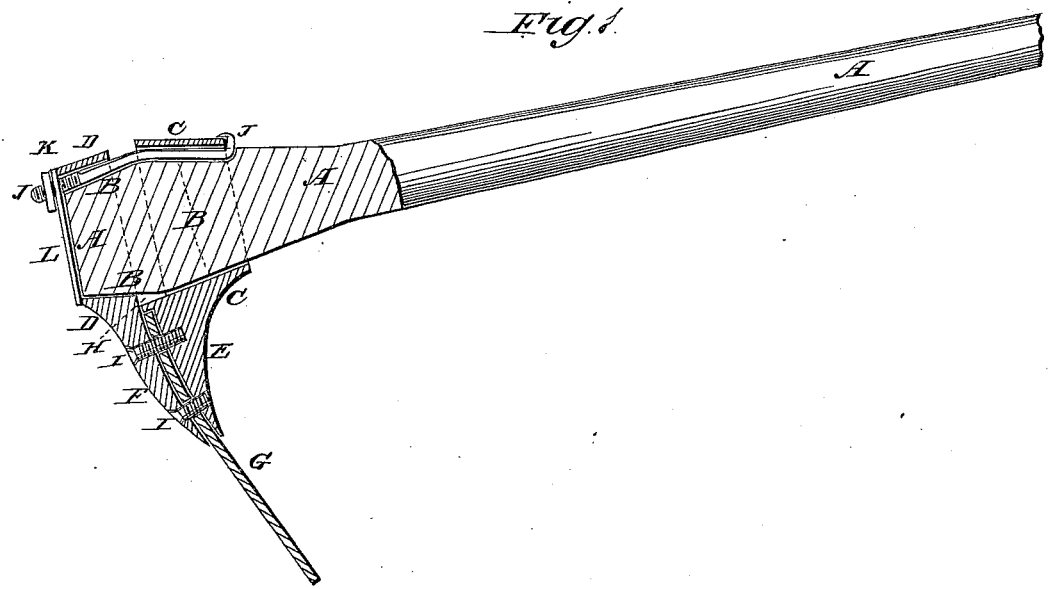
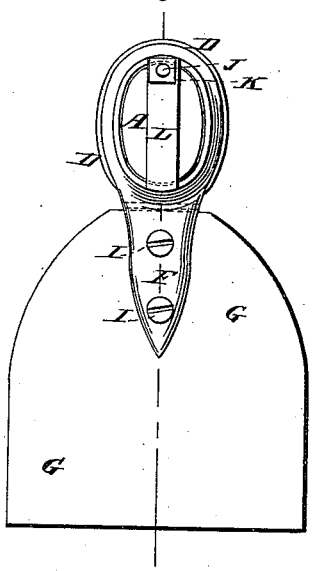
WITNESSES:
Francis McArdle
C. Sedgwick
INVENTOR:
J. R. Thomas,
BY Munn & Co.
ATTORNEYS.

UNITED STATES PATENT OFFICE.

JAMES R. THOMAS, OF CALPELLA, CALIFORNIA, ASSIGNOR TO HIMSELF AND TIMOTHY S. PAUL, OF SAME PLACE.

EYE FOR HOES AND OTHER TOOLS.

SPECIFICATION forming part of Letters Patent No. 228,419, dated June 1, 1880.

Application filed February 24, 1880.

*To all whom it may concern:*

Be it known that I, JAMES ROBERDS THOMAS, of Calpella, in the county of Mendocino and State of California, have invented a new and useful Improvement in Eyes for Hoes and other Tools, of which the following is a specification.

Figure 1 is a sectional elevation of my improvement. Fig. 2 is a rear elevation.

The object of this invention is to furnish eyes for securing hoe-blades and other tools to handles, so constructed that the blades or tools will be held firmly in place and may be detached and exchanged when desired.

The invention consists in constructing the eye in two parts, made with conical or flaring apertures, and provided with jaws upon their lower sides, and secured to each other and to the handle by screws or bolts and by a bulge formed upon the handle, as will be hereinafter fully described.

A represents the handle, which is made with a swell or bulge, B, upon its lower part. The swell or bulge B is made in the form of two truncated cones placed base to base, and made elliptical in form to prevent the eye from turning upon it.

The eye is made in two parts, C D. The cavities of the parts C D are so formed as to fit snugly upon the bulge B, the one part, C, being put on from the upper end of the handle A, and the other part, D, being put on from the lower end of the said handle A.

Upon the lower sides of the parts C D of the eye are formed jaws E F, between which the hoe-blade G or other tool is inserted. The jaws E F are so formed as to give the desired pitch or inclination to the hoe-blade or other tool, and upon the base of one of the jaws, as E, is formed a shoulder or lip, H, for the upper edge of the tool G to rest against.

The blade or tool G is secured to and between the jaws E F by screws or bolts I. When screws are used they are passed through the jaw F and tool G, and are screwed into the jaw E. When bolts are used they are passed through the jaws E F and the tool G, and have nuts screwed upon their forward ends. The heads of the screws or bolts I and the nuts, when used, are countersunk into the jaw E, so as to leave a smooth surface.

The parts C D of the eye are kept from spreading at the upper side of the handle A by a bolt, J, which is made with a hook or L-head, to engage with the upper edge of the part C, and has a nut, K, screwed upon its forward end to bear against the edge of the part D.

If desired, a washer, L, may be used to form a smooth bearing for the nut K.

The inner side of the bolt J may be made straight to fit into a groove in the top of the bulge B; but its outer side should be so shaped as to correspond with the surface of the bulge B.

Having thus described my invention, what I claim as new, and desire to secure by Letters Patent, is—

1. The eye constructed, substantially as herein shown and described, of the two parts C D, made with conical or flaring apertures to fit upon the bulge B of the handle A, and provided with jaws E F to receive and clamp a tool, G, as set forth.

2. The combination, with the parts C D of the eye, of the handle A, provided with a bulge, B, substantially as herein shown and described, to fit into the apertures of the eye C D, as set forth.

3. The combination, with the parts C D of the eye and the bulge B of the handle, of the bolt J and nut K, substantially as herein shown and described, to hold the parts C D of the eye in place, as set forth.

4. The combination, with the tool G and the handle A, made with a bulge, B, of the two parts C D of the eye, provided with the jaws E F, the screws or bolts I, and the bolt and nut J K, substantially as herein shown and described, for securing the tool to the handle, as set forth.

JAMES ROBERDS THOMAS.

Witnesses:
BEN. W. DAY,
J. T. ROGERS.